United States Patent Office 2,769,541
Patented Nov. 6, 1956

2,769,541

BENEFICIATION OF IRON ORES

Richmond E. Perry, Tuscaloosa, Ala., assignor to United States Pipe and Foundry Company, Burlington, N. J., a corporation of New Jersey No Drawing. Application April 9, 1953,
Serial No. 347,831

17 Claims. (Cl. 209—166)

This invention relates to beneficiation or concentration of siliceous iron ores. More particularly, it concerns a new and improved method for separating the iron oxide content from the gangue, sands, clays, chert and other diluents with which it is associated in the usual brown ores or limonites.

Limonites or "brown" ores are secondary formations derived from other iron-bearing minerals, such as the iron silicates, iron carbonates, iron sulfides, etc. Scattered deposits of these ores are found in the United States from Texas to Vermont. However, Alabama, Tennessee, and Georgia are the States where the greatest quantity is mined. The brown ores contain varying amounts of manganese, alumina, silica, phosphorous and sulfur as impurities. As the most accessible ores have been depleted, mining has become more mechanized and the ores now recovered contain large proportions of gangue and other diluent materials.

Prior practice in concentrating brown ores has been to discard a large percentage of minus six mesh (U. S. Standard series) or finer material for lack of an economical method of separating limonite from the diluents. Also, fines from washers treating other iron ores, e. g. those containing limonite and magnetite, have been discarded for the same reason. The ordinary gravity-concentration methods are not applicable to brown ores because there are such small differences in the specific gravities of the ore and the diluents. Furthermore, any difference in gravity has been generally nullified by the difference in the particle shape of the ore and that of the diluents. The ore is four sided, or "blocky," and the silica diluent, for instance, is usually well rounded. When treated on a concentrating table, the rounded sand particles settle through the "blocky" ore particles, thus being trapped, and travel toward the concentrate discharge end of the table deck.

It is among the objects of this invention to overcome these and other disadvantages of hitherto known methods for concentrating iron ores, especially relatively "lean" brown ores. Other, more specific objects are: to provide a practical, economic method of recovering iron oxide-bearing mineral from low iron content materials, particularly materials now generally discarded from brown ore washers as commercially useless; to make use of inexpensive, readily available reagents to recover valuable iron ore minerals from their admixture with chert, sand, clay and like diluents; and to employ wastes or by-products from paper mill operations to effect such recovery.

The above and other objects are realized by the present invention, which broadly comprises selectively filming or coating the iron oxide content of siliceous iron ores with certain reagents, while leaving essentially unaffected the various usual contaminants and diluents, so that the iron appears lighter in specific gravity than the bulk of such impurities. The result of this preferential coating treatment is that the iron content will float in a flotation machine or act as a light-gravity material in tabling, whereby it is speedily and efficiently separated even from those diluents which would normally be of very similar specific gravity.

More specifically, the invention comprises activating an aqueous pulp of siliceous oxidized iron ore with a water-soluble compound of an inorganic anion and an alkaline earth metal, conditioning the pulp with a water-soluble inorganic alkali metal compound, and treating the conditioned pulp with a petroleum oil in the presence of an anion-active collecting agent. This treatment results in the peculiarly selective coating of the iron oxide particles in the ore, leaving unaffected the various impurities, gangue, sands, chert and the like. When the treated pulp is then transferred to a flotation or concentration device, the beneficiated iron minerals rise to the top of the mass and are recovered, while the siliceous gangue is depressed and separated out.

Thus, according to one preferred embodiment of the invention, a relatively high-solids content, aqueous pulp of comminuted brown ore is first freed of excessive slime by conventional desliming methods. A small quantity of an alkaline earth hydroxide, chloride, nitrate or other salt, or mixtures of such hydroxides and/or salts, is then added as an activator, and conditioning is allowed to proceed for a short time. A second pulp conditioner and pH regulator, especially an alkali metal hydroxide or carbonate, is then introduced. When the pulp has been thus treated, a small proportion of a petroleum oil and an anion-active collector, notably a higher fatty acid, resin acid, and/or soaps thereof, are added. The pulp is agitated for a few (generally 3 to 5) minutes with these additives, whereupon it is ready for the desired separation. This separation may be achieved by agglomerate tabling, flotation or other conventional methods.

As previously mentioned, the initial pulp conditioning is effected with an activator which is a water-soluble compound of an inorganic anion with an alkaline earth metal. Especially useful types of anions are hydroxides, carbonates, chlorides, nitrates, mixtures of two or more such salts and the like. As examples of these activators may be mentioned calcium hydroxide, magnesium hydroxide, the corresponding chlorides and nitrates, barium hydroxide or chloride and strontium chloride, hydroxide or nitrate. Only a small quantity of such materials need be used. Generally from one-half to four pounds per ton of ore, and treatment therewith for between three and five minutes, is usually sufficient. In the case of hydrated lime, for instance (a preferred reagent because of its efficiency, availability and cheapness), one-half to four pounds per ton is a preferred proportion, with which conditioning need last for only three to four minutes.

Concurrent with or following the activation, pH-regulation and conditioning are effected with a water-soluble alkali metal compound, especially an hydroxide or carbonate. For instance, between one and three pounds of NaOH per ton of brown ore is effective both for alkalization to the desired pH range (say pH 9 to 12) and for deactivation or removal of film from the quartz, chert and other diluents. This inhibition of filming is one of the reasons for the selectivity of the subsequent oil-collector coating operation. The amount of these alkali metal conditioners and the period of time allowed for conditioning necessarily depend on the individual characteristics of the particular ore; but generally speaking from one-half to three pounds of sodium or potassium hydroxide or carbonate per ton of ore, and treatment for three to five minutes, give excellent results. Preferred quantities and times are readily determinable by one skilled in the art. It should be noted, also, that these metallic compounds function as pH regulators, i. e. they establish the proper hydrogen ion concentration of the pulp to give best results when using the flotation procedure and when using the agglomerate tabling process to effect concentration of the iron mineral.

A variety of petroleum oils may be employed in the subsequent coating step of the new process. The term "petroleum oils" is used herein in its customary commercial meaning, i. e. the liquid petroleum products employed for lubricating purposes. These products can be defined as normal hydrocarbons having more than 5 carbon atoms and less than 16 carbon atoms with the appropriate hydrogen atom to satisfy the general formula, $C_nH_{2n+2}$. A particularly useful oil is that generally referred to as "used motor oil," e. g. mixtures of oils having SAE values substantially between 10 and 40 and obtained from automobile crank cases when oil is changed periodically. Other useful types are ordinary fuel oils, lubricants, mineral oil, kerosene and similar petroleum fractions, e. g. crude oil (specific gravity usually 0.85–0.95) or other mixtures of paraffin hydrocarbons.

Only a very small proportion of these protective oils need be added to the conditioned ore pulp. When employing a standard motor oil, for instance, about two to four pounds per ton of material is generally sufficient. Usually the petroleum oil and anion collector are added simultaneously, but of course they may be separately introduced. After their addition the pulp need only be conditioned or agitated for a few minutes, say about three to five minutes, to achieve the desired filming of the iron oxide component.

The anion-active collecting agents may also be of varied types. Particularly useful are the higher and intermediate fatty acids, containing at least about 8 and up to about 20, and preferably between 10 and 18 carbon atoms in their primary chains, e. g. coconut oil fatty acid, soybean oil fatty acid, linseed and cottonseed oil fatty acids, oleic acid or red oil, tall oil crude, tall oil refined, stearic acid, palmitic acid, fish oil, fatty acid, soaps derived therefrom, etc.; rosin acids (usually defined as oxidation or polymerization products of the terpenes and generally containing "resin" acids and esters); mixtures of rosin and fatty acids or their soaps. The collector most preferred by reason of its availability and cheapness is tall oil. This is a paper mill by-product, derived from the manufacture of wood pulps, and is primarily a mixture of resin acids and fatty acids. It is normally a mixture of fatty acids, sterols, rosin acids, high molecular weight alcohols, and other materials. The exact composition varies; for instance, that obtained from one given area or location will not have the same composition as that obtained elsewhere. Usually tall oil has an acid number of approximately 168. As with the other conditioning agents, only a very small proportion of the anion-active compound need be employed, e. g. generally from one-half to three-fourths the quantity by weight of the petroleum oil employed.

For the steps of activation, conditioning and filming, the ore pulp should have a high solids content. Simply enough water may be present to wet the material well, and generally a solids content of at least about 60%, and preferably between 60% and 80% by weight, is best. Following these treatments, the material is ready for either agglomerate tabling, flotation or other conventional mechanical separation means. The oxidized iron content of the ore is selectively coated and separated readily from the unfilmed diluents.

As previously indicated, the invention is not confined to treating limonites, but is effective with siliceous oxidized iron ores in general. Other ores which may be thus advantageously beneficiated are red ores, taconite, hematite, magnetite, mixtures thereof and the like. Selective coating is generally achieved simply at atmospheric temperatures and pressures, no unusual operating conditions or equipment being necessary.

There are a number of particular advantages of the invention. A primary one is, of course, the fact that diluents are so readily separated from the desired iron oxides, even though the impurities are normally of about the same specific gravity. Another advantage is that the two types of metal conditioners are inexpensive, readily obtained in commerce and easily handled. The common alkaline earth and alkali metal hydroxides and salts, for instance, at one and the same time condition and activate the ore, regulate the pH of the flotation liquid, and retard filming of the chert, quartz and other contaminants. An additional advantage lies in the fact that more efficient use of machinery can be made under the basic conditions obtained, than would be true in an acid circuit. Furthermore, lean ores, or material from brown ore washers and other tailing ponds, which do not respond to other beneficiation methods, can readily and efficiently be treated by the new process. The method is also not sensitive to minor variations in reagents; and finally, grinding costs, where coarse diluents are present, are greatly reduced.

The following examples are given simply to illustrate this invention and not in anyway to limit its scope. Indeed, as many apparently widely different embodiments of this invention may be made without departing from the spirit and scope hereof, it is to be understood that this invention is only limited by the specific wording of the appended claims.

Example I

Brown ore tailings, discarded from a standard jig and 70% thereof being —6+14 mesh size, were deslimed by washing in water. Solids content of this material (pH 7.2) was about 70% by weight. One pound of $Ca(OH)_2$ per ton of pulp was added, and the ore was conditioned in a pan for three minutes, with agitation to cause intimate contact with the reagent. The mass then had a pH of about 9.5. Sodium hydroxide (two pounds per ton) was then added to raise the pH to 11.2, and the pulp was thoroughly mixed for ten minutes.

Two pounds of tall oil per ton were then added, followed by four pounds of motor oil (SAE 30), and the conditioning procedure was repeated for three minutes. The ore was then separated on a standard, laboratory size concentrating table. The following results were obtained.

|  | Weight Percent | Percent Fe | Percent Fe Recovered |
| --- | --- | --- | --- |
| Concentrate | 56.8 | 44.5 | 76.5 |
| Tailings | 43.2 | 18.0 | 23.5 |
| Composite | 100.0 | 33.1 | 100.0 |

To another sample of the same deslimed brown ore tailings were added two pounds per ton of tall oil and four pounds of the same motor oil. Conditioning was effected as above for three minutes. There was filming of the pump solids, but it was not selective as in the first test.

|  | Weight Percent | Percent Fe | Percent Fe Recovered |
| --- | --- | --- | --- |
| Concentrate | 52.3 | 35.8 | 55.6 |
| Tailings | 47.7 | 31.3 | 44.4 |
| Composite | 100.0 | 33.7 | 100.0 |

The same treatment was repeated, but omitting the alkaline earth compound. This product did not film.

It will be noted that, using identical reagent combinations but leaving out the calcium hydroxide, the ore is not filmed; using the same conditions but omitting both alkaline reagents, the filming was not selective for the iron oxide content of the pulp.

Example II

A sample of similar brown ore feed to a jig roll (Russellville) was crushed to —14 mesh and treated as an aqueous pulp (density 70–80% solids by weight) with 1 lb./ton of $Ca(OH)_2$, 2 lbs./ton of NaOH, 2 lbs. tall oil and 4 lbs. motor oil, just as in Example I. The following results were realized:

|  | Weight Percent | Percent Fe | Percent Fe Recovered |
|---|---|---|---|
| Concentrate | 68.2 | 49.7 | 82.5 |
| Tailings | 31.8 | 22.6 | 17.5 |
| Composite | 100.0 | 41.1 | 100.0 |

*Example III*

A sample of the ore of Example II (−14 mesh) was conditioned in the same manner, but with these proportions of reagents: a mixture of 1 lb. Ca(OH)$_2$ with ¼ lb. barium chloride per ton, followed by 2 lbs. NaOH, then 3 lbs. tall oil plus 4 lbs. motor oil.

|  | Weight Percent | Percent Fe | Percent Fe Recovered |
|---|---|---|---|
| Concentrate | 74.6 | 50.1 | 88.9 |
| Tailings | 25.4 | 18.4 | 11.1 |
| Composite | 100.0 | 42.0 | 100.0 |

*Example IV*

With the procedure of Example III, simply using ¼ lb. per ton of magnesium chloride instead of ¼ lb. of barium chloride, the following results were obtained:

|  | Weight Percent | Percent Fe | Percent Fe Recovered |
|---|---|---|---|
| Concentrate | 58.9 | 45.5 | 30.2 |
| Tailings | 41.1 | 16.0 | 19.8 |
| Composite | 100.0 | 33.4 | 100.0 |

*Example V*

To the pulp of Example II were added 1 pound per ton Ca(OH)$_2$ plus ¼ pound strontium nitrate, with conditioning for three minutes. Two lbs. per ton of KOH were then mixed therewith for 3 minutes, followed by 2 lbs. tall oil plus 4 lbs. motor oil for 3 minutes. Conventional tabling then gave these fractions:

|  | Weight Percent | Percent Fe | Percent Fe Recovered |
|---|---|---|---|
| Concentrate | 54.4 | 46.1 | 74.7 |
| Tailings | 45.6 | 18.6 | 25.3 |
| Composite | 100.0 | 33.6 | 100.0 |

*Example VI*

The process of Example II was repeated, but in lieu of lime one pound barium hydroxide was used (pH 8.1). Two pounds per ton NaOH conditioning for three minutes then gave pH 10.7.

|  | Weight Percent | Percent Fe | Percent Fe Recovered |
|---|---|---|---|
| Concentrate | 72.8 | 39.4 | 85.2 |
| Tailings | 27.2 | 18.4 | 14.8 |
| Composite | 100.0 | 33.7 | 100.0 |

*Example VII*

Brown ore was ground in a rod mill to minus sixty-five mesh and deslimed at twenty microns using ½ lb. per ton "N" sodium silicate to disperse the pulp. One pound Ca(OH)$_2$ per ton was added and the pulp conditioned three minutes; two pounds NaOH were then used (conditioned three minutes), followed by 1.5 lb./ton tall oil and three lbs. motor oil (conditioned three minutes). The pulp was then transferred to a float cell, water added and pH determined to be 9.5.

|  | Weight Percent | Percent Fe | Percent Fe Recovered |
|---|---|---|---|
| Cleaner Concentrate | 39.2 | 49.1 | 57.7 |
| Middlings | 16.3 | 31.3 | 15.3 |
| Tailings | 44.5 | 20.2 | 27.0 |
| Composite | 100.0 | 33.3 | 100.0 |

The concentrate was refloated using no additional reagents, thus obtaining the cleaner concentrate and middlings products.

*Example VIII*

A sample of ferruginous sandstone from Red Mountain Sadler's Gap area was treated exactly as in Example VII, with the two exceptions that one pound "N" sodium silicate per ton was used to disperse the pulp, and only one-half pound Ca(OH)$_2$ activator was added. pH was 11.0 and the treated mass was floated in a flotation cell.

|  | Weight Percent | Percent Fe | Percent Fe Recovered |
|---|---|---|---|
| Concentrate | 33.3 | 35.8 | 67.2 |
| Tailings | 66.7 | 8.7 | 32.8 |
| Composite | 100.0 | 17.7 | 100.0 |

This shows that red ores can be selectively filmed by the new method, as well as brown ores.

*Example IX*

Nonmagnetic taconite was ground to minus 35 mesh in a rod mill for three minutes, one pound sodium carbonate being added to the pulp before placing it in the mill. The ground ore was deslimed at twenty microns, and the pulp allowed to set for four hours (solids content then 60%). One half pound of lime per ton was added to the ore and conditioned three minutes. Then two pounds per ton sodium carbonate were added and the mass conditioned three more minutes. Two pounds per ton of tall oil and three pounds of motor oil were finally added and the pulp conditioned three minutes.

|  | Weight Percent | Percent Fe | Percent Fe Recovered |
|---|---|---|---|
| Cleaner Concentrate | 39.6 | 51.1 | 57.6 |
| M-1 | 18.7 | 35.6 | 19.0 |
| Tailings | 41.7 | 19.7 | 23.4 |
| Composite | 100.0 | 35.1 | 100.0 |

*Example X*

To another sample of the Russellville brown ore pulp of Example II were added one pound per ton calcium hydroxide (conditioned three minutes) and 1.5 pounds per ton sodium carbonate (conditioned three minutes to pH 9.5). The pulp was then treated with two pounds tall oil and three pounds motor oil per ton, conditioned three minutes, and separated by causing the ore to float to the surface of water in the pan by adding a jet of water and then pouring off the float product into another container.

|  | Weight Percent | Percent Fe | Percent Fe Recovered |
|---|---|---|---|
| Concentrate | 51.4 | 40.2 | 63.3 |
| Tailings | 48.6 | 24.7 | 36.7 |
| Composite | 100.0 | 32.7 | 100.0 |

I claim:

1. A method of beneficiating siliceous oxidized iron ores which comprises, first activating an aqueous pulp of such ores with a water-soluble compound of an inorganic anion and an alkaline earth metal and conditioning the pulp with a water-soluble inorganic alkali metal compound, then treating the so-activated and conditioned pulp with a petroleum oil in the presence of an anion-active collecting agent selected from the group consisting of fatty acids, rosin acids, and soaps thereof, and subjecting the treated pulp to a gravitational separation whereby a concentrate relatively rich in iron minerals and a tailing containing a major proportion of siliceous material are produced.

2. A method according to claim 1 wherein the siliceous oxidized iron ore beneficiated is deslimed comminuted brown ore.

3. A method according to claim 1 wherein the alkaline earth metal compound is selected from the group consisting of hydroxides, carbonates, chlorides, nitrates and mixtures thereof.

4. A method according to claim 1 wherein the alkaline earth metal compound is hydrated lime.

5. A method according to claim 1 wherein the alkali metal compound is sodium hydroxide.

6. A method according to claim 1 wherein the anion-active collecting agent is tall oil.

7. A method according to claim 1 wherein the ore treated is a limonite.

8. A method according to claim 1 wherein the petroleum oil is a normal hydrocarbon oil of the formula $C_nH_{2n+2}$, where $n$ is more than about 5 and less than about 16.

9. A method according to claim 1 wherein the anion-active collecting agent is selected from the class consisting of fatty acids containing substantially between 8 and 20 carbon atoms in their primary chains, mixtures of such acids with resin acids and soaps thereof.

10. A method according to claim 1 wherein the alkaline earth metal compound is an hydroxide.

11. A method according to claim 1 wherein the alkaline earth metal compound is a salt.

12. A method according to claim 1 wherein the pulp is initially contacted with a mixture of different alkaline earth metal compounds.

13. A method according to claim 1 wherein the alkali metal compound is an hydroxide.

14. A method according to claim 1 wherein the alkali metal compound is a carbonate.

15. A method of beneficiating siliceous oxidized iron ores by froth flotation which comprises, first activating an aqueous pulp of such ores with a water-soluble compound of an inorganic anion and an alkaline earth metal and conditioning the pulp with a water-soluble inorganic alkali metal compound, then treating the so-activated and conditioned pulp with a petroleum oil in the presence of anion-active collecting agent selected from the group consisting of fatty acids, rosin acids, and soaps thereof, and subjecting the treated pulp to a froth flotation operation whereby a concentrate relatively rich in iron minerals and a tailing containing a major proportion of siliceous material are produced.

16. A method of beneficiating siliceous oxidized iron ores by froth flotation of iron minerals from silica-bearing gangue which comprises, first making an aqueous pulp of such ore having a solids content of at least about 60 percent, next activating said pulp with from about one-half to four pounds per ton of a water-soluble compound of an inorganic anion and an alkaline earth metal and conditioning the activated pulp with from about one-half to three pounds per ton of a water-soluble inorganic alkali metal compound, then treating the conditioned pulp with from about two to four pounds per ton of a petroleum oil in the presence of from about one to three pounds per ton of an anion-active collecting agent selected from the group consisting of fatty acids, rosin acids, and soaps thereof, and subjecting the treated pulp to a froth flotation, whereby a concentrate rich in iron and relatively free from silica-bearing gangue is floated away from a tailing containing a major portion of the gangue.

17. A method of beneficiating brown iron ore by froth flotation which comprises, first mixing a small amount of calcium hydroxide with an aqueous pulp of the deslimed comminuted ore, said pulp having a solids content of at least about 60 percent by weight, adding to the mixture a small amount of sodium hydroxide, then agitating the resulting mixture in the presence of motor oil and tall oil, and subjecting the mixture to a froth flotation operation whereby a concentrate relatively rich in iron minerals and a tailing containing a major proportion of siliceous material are produced.

References Cited in the file of this patent

UNITED STATES PATENTS

| 1,492,904 | Sulman et al. | May 6, 1924 |
| 2,283,295 | Tartaron et al. | May 19, 1942 |
| 2,364,777 | Brown et al. | Dec. 12, 1944 |
| 2,419,945 | Clemmer et al. | May 6, 1947 |
| 2,423,022 | Herkenhoff | June 24, 1947 |
| 2,470,150 | De Vaney | May 17, 1949 |

OTHER REFERENCES

Taggart, Handbook of Mineral Dressing (c), 1945, section 12, page 18. (Copy in Division 55.)